United States Patent [19]
Finck

[11] Patent Number: 6,035,765
[45] Date of Patent: Mar. 14, 2000

[54] CONVEYORIZED BUN GRILLER WITH NON-MARKING BELTS

[75] Inventor: Mark Harlow Finck, Davie, Fla.

[73] Assignee: Welbilt Corporation, Stamford, Conn.

[21] Appl. No.: 09/219,918

[22] Filed: Dec. 23, 1998

[51] Int. Cl.[7] .................................................. A47J 37/00
[52] U.S. Cl. ............................ 99/386; 99/393; 99/443 C
[58] Field of Search .............................. 99/386, 387, 393, 99/443 C; 198/615, 848, 849

[56] References Cited

U.S. PATENT DOCUMENTS

| | | |
|---|---|---|
| 3,329,256 | 7/1967 | Elgaway . |
| 3,374,751 | 3/1968 | Werner .................................. 99/386 X |
| 3,646,880 | 3/1972 | Norris ................................. 99/443 C X |
| 3,659,517 | 5/1972 | Holen ................................. 99/443 C X |
| 3,961,569 | 6/1976 | Kenyon et al. .................... 99/443 C X |
| 4,444,094 | 4/1984 | Baker et al. ............................... 99/327 |
| 4,488,480 | 12/1984 | Miller et al. ............................... 99/386 |
| 4,523,520 | 6/1985 | Hofmann et al. ......................... 99/352 |
| 4,701,340 | 10/1987 | Bratton et al. .......................... 426/511 |
| 5,588,354 | 12/1996 | Stuck et al. ........................... 99/349 X |

*Primary Examiner*—Reginald L. Alexander
*Attorney, Agent, or Firm*—Ohlandt, Greeley, Ruggiero & Perle

[57] ABSTRACT

A conveyor bun griller having a textured low-friction conveyor belt surface. This surface has more friction than an untextured low-friction surface, thus permitting the buns to be grilled without aesthetically undesirable markings, but also without creating handling problems for users of the griller.

12 Claims, 2 Drawing Sheets

CONVEYORIZED BUN GRILLER WITH NON-MARKING BELTS

This application is a conversion of a provisional application, Ser. No. 60/068,879, filed Dec. 25, 1997 and entitled Conveyorized Bun Griller with Non-Marking belts.

The present invention relates to a mechanized bun grilling device having a bun conveyor belt that does not mark the exterior of the buns during grilling. In particular, it relates to a high temperature, solid weave non-stick conveyor belt for use in a conveyorized bun griller.

BACKGROUND OF THE INVENTION

Contact toasting of buns has been offered to the commercial food service market for a number of years. The method of moving product in a conveyor across a hot surface to toast the product is referred to as conveyor bun grilling. This grilling method requires the bun to be pressed against the hot surface as it is moved along the conveyor, to provide quick, even toasting.

Horizontal grillers having a heated bun discharge and holding area are known in the art. These grillers preferably utilize a spring tension track support to apply pressure to the bun, to ensure even and adequate grilling. However, grillers of this design have been subject to certain limitations. For example, while the spring tension track support provides a more uniform toasting of the cut side of the bun, by pressing the cut surface firmly and evenly against the grilling surface, it also leaves markings on the exterior of the bun. The pressure applied by the spring tension track support creates these markings on the rounded surface of the bun These markings can be considered to be aesthetically undesirable.

Accordingly, a conveyor bun griller is needed that can effectively grill the cut surfaces of a bun, without creating undesirable markings or impressions on the exterior of the bun.

Different wire type conveyor belts having tighter spacings were evaluated in attempting to reduce the incidence of bun marking. The belt with the tightest spacing tested was a wire mesh belt that was 90% closed. These wire mesh belts were heavy, however, which reduced the ability of the spring track to conform to the shape of the bun. Moreover, the metal conveyors continued to cause an impression or conveyor mark on the bun, and accordingly, were not satisfactory.

Next, attempts were made to cover the existing wire conveyor with a belt material. Due to the high operating temperature of the conveyor, a polytetrafluoroethylene sheet material was selected. This material is also the preferred material for use on the hot top platen griller surface. While the results were positive—the wire belt markings were eliminated—the smooth, slick surface of the polytetrafluoroethylene material caused problems with the feeding of the bun. Upon initial infeed, the bun would not enter the area between the upper hot platen and the lower conveyor belt without manual assistance. Once the bun was between the platen and conveyor, the bun would move, maintaining contact to toast when set at minimum pressure. However, as pressure would be applied to increase the toasting results, the compression would cause the bun to stall on the slick track surface.

Accordingly, a conveyor bun griller is needed that can prevent markings on the exterior of the bun, while conveying the bun reliably, without catching or stalling. The goal is to maximize the initial pressure applied to the bun while the bun is most resilient ("preferably below about 1300F.). This allows for maximum heat transfer. Once the bun absorbs heat the softened product will deform. Thus, the compression by the belt is reduced at the end of the cycle.

SUMMARY OF THE INVENTION

The present invention provides a conveyor bun griller having a conveyor belt with a textured low-friction surface with thermally conductive properties. This surface has more friction than an untextured low-friction surface, thus permitting the buns to be grilled without aesthetically undesirable markings, but also without creating handling problems for users of the griller.

DESCRIPTION OF THE PREFERRED EMBODIMENTS

Figure 1:
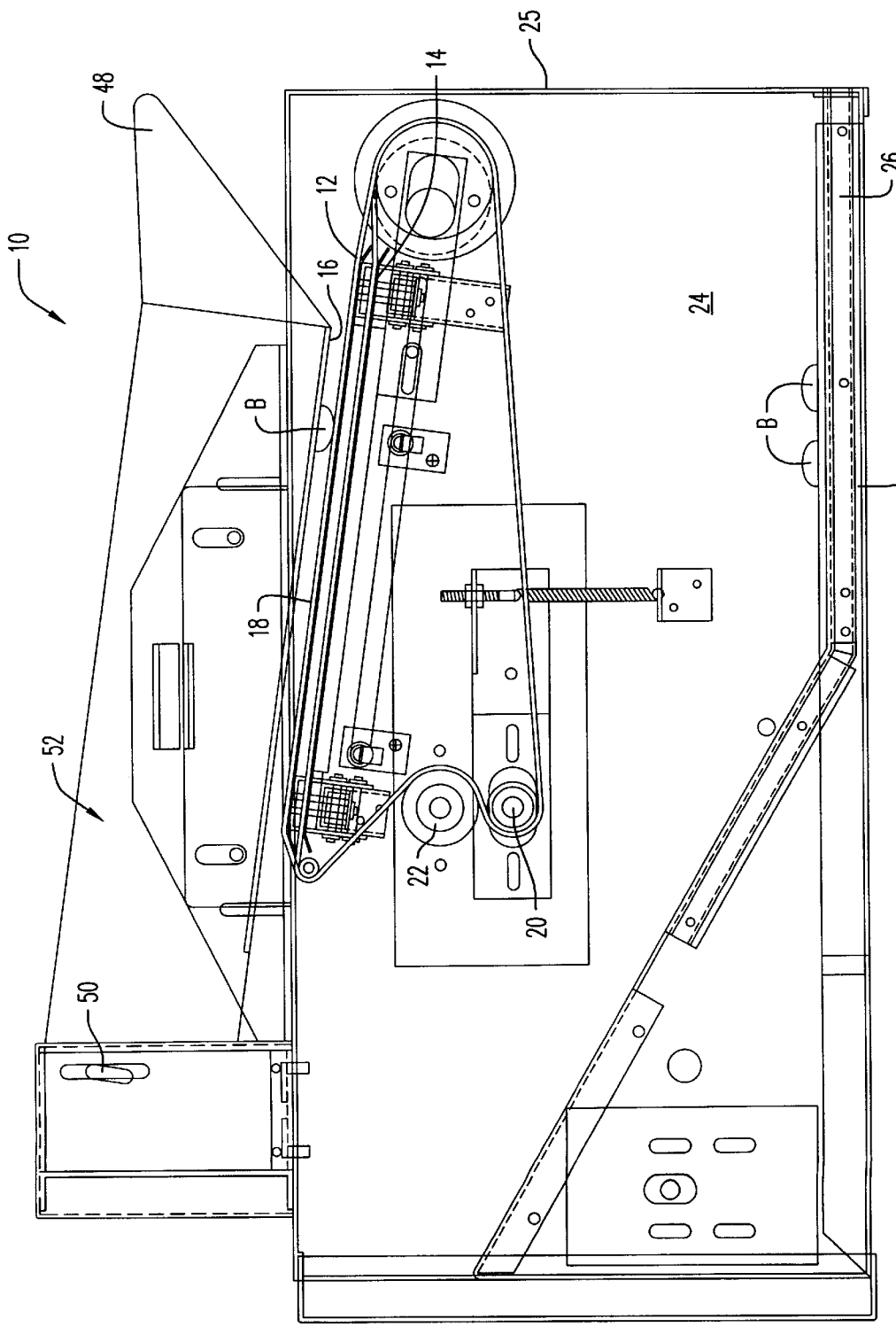
FIG. 1 is a side view of a preferred conveyor bun griller of the present invention.

A preferred conveyor bun griller 10 is depicted in FIG. 1. Griller 10 includes conveyor belt 12, seated between spring tension track support 14 and hot top platen 16. Conveyor belt 12 accepts bun B and carries bun B through griller 10. Bun B is held in contact with platen 16 under variable tension by track support 14, to ensure proper grilling.

Conveyor belt 12 and track support 14 are mounted within a housing 24. Housing 24 includes an upper housing assembly 52. Platen 16 is mounted within upper housing assembly 52.

According to the present invention, top surface 18 of conveyor belt 12 is made of a high temperature, low friction surface such as polytetrafluoroethylene or silicone material. It is preferred that this surface be textured, having more friction than an untextured surface of the same material. Of the high temperature belts tested, the silicone material provided the best results. One, two, or a greater number of parallel conveyor belts 12 can be used.

In one embodiment, a conventional metal conveyor belt can be overlaid with a high temperature belt. This dual system is less preferred, however, because it increases the cost and complexity of griller 10. Accordingly, as depicted in FIG. 1, a preferred griller 10 according to the present invention includes a conveyor belt 12 formed of a solid weave of low-friction, high temperature material such as polytetrafluoroethylene or silicone material. In a most preferred embodiment, the lower belt is made of a silicone material. This silicone material has increased friction, providing the optimal means of transferring the bun, in addition to adding heat to the bun product. The weave of the material provides some friction, to enable the conveyor belt 12 to accept and convey bun B reliably through griller 10. A moderate amount of friction can also be provided to conveyor belt 12 through patterning and other texturizing methods. However, it is important that the texture not be so extreme as to create markings on the surface of bun B. These markings can cause bun B to have an overly crusty baked surface on its crown and heel.

The solid weave low-friction conveyor belt 12 must thus preferably be operated without a metal conveyor belt. This presents a need for a drive system that can move the conveyor belt 12, without the advantages of metal gear teeth mating into a metal conveyor. The grillers 10 of the present invention having a low-friction belt only, without a metal conveyor, are preferably driven by pinch rollers 20 and 22. The conveyor belt 12 is formed into an endless loop, which runs between first and second pinch rollers 20 and 22. First pinch roller 20 turns as the drive roller, while second pinch roller 22, under tension, maintains pressure between conveyor belt 12 and first pinch roller 20. This drive method allows the conveyor belt 12 to operate loosely over the track support 14. Allowing conveyor belt 12 to operate over track support 14 in this manner causes the conveyor belt 12 to conform to the shape of bun B, thus improving the appearance and taste of the final product.

Figure 2:
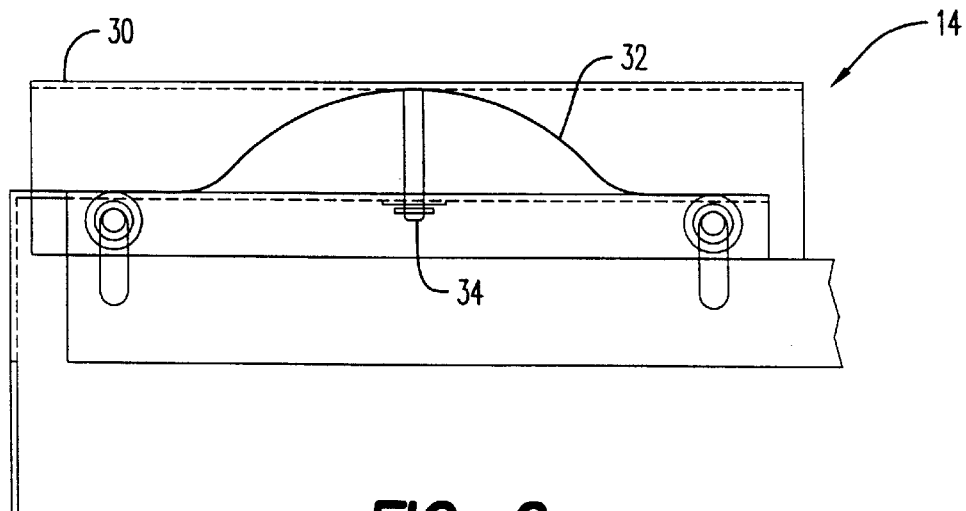
FIG. 2 is a cross section of a conveyor belt track of the griller of FIG. 1.

As shown in FIG. 2, track support 14 preferably includes track support crown 30 supported by leaf spring 32. Leaf spring 32 is in turn supported by vertical guide pin 34. In addition (see FIG. 1), griller 10 is preferably provided with a top platen 16 having a handle 48 and a hinge 50 to allow top platen 16 to be lifted away from conveyor belt 12. This permits the area of conveyor belt 12 to be accessed for cleaning or bun retrieval.

The bun B, having passed on conveyor belt 12 through griller 10 preferably for about 30 to 35 seconds), drops into holding area 24. The toasted bun B has a preferred internal temperature of about 158 to 170° F., at the middle, or centroid, of bun B. In holding area 24, bun B must hold for up to about 5 minutes with a desirable texture (no surface hardening) and a minimum temperature of about 140° F. To facilitate this, holding area 24 includes a water pan 26, preferably a stationary pan with a drain (not shown), Water pan 26 provides a humidified environment within holding area 24, to maintain bun B at near-optimal condition. Water pan 26 can be heated by heater 28 to rapidly humidify holding area 24. Water pan 26 can also be removable, in which case a drain would not be necessary. Holding area 24 can be enclosed with a translucent vertical strips 25 to act as an air block door to reduce the effects of ambient temperature and humidity on the holding environment.

Figure 3:
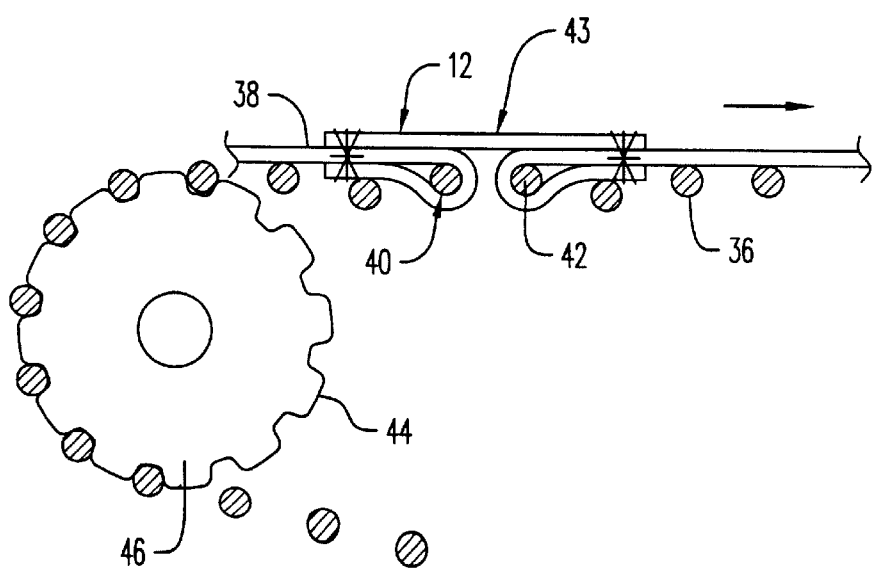
FIG. 3 is a partial cross section of an alternate embodiment conveyor belt according to the present invention.

Although less preferred, the textured conveyor belt 12 can be used over a metal conveyor 36, as shown in FIG. 3. This metal conveyor 36 preferably has coarse ⅝ inch cross wire spacing. In this embodiment, polytetrafluoroethylene sleeve 38 is placed over metal conveyor 36, and is seamed onto and looped around two adjacent bars 40,42 of metal conveyor 36. A loose flap or tab 43 of polytetrafluoroethylene can then be seamed to conveyor belt 12 over bars 40, 42 to protect the belt connection points. This construction permits retrofitted use of an existing metal conveyor 36, while allowing bars 40 and 42 to be engaged by teeth 44 of drive sprocket 46. The polytetrafluoroethylene can be a black material. As discussed above, even better performance can be achieved by replacing the polytetrafluoroethylene material with a silicone belt material. This silicone belt material increases the friction on the bun, providing the necessary means to transfer the bun product. This silicone material also provides a thermal energy which aids in adding heat to the bun product.

The low friction textured surface belts may be any belt having the properties of a low friction and textured surface. For example, embodiments according to the invention may use either a silicone material belt or a polytetrafluoroethylene belt.

As another approach to overcoming excessive bun friction and providing improved bun transfer is to use two parallel belts, one top and one bottom. The two belts are moved at the same speed in the same direction, carrying the buns between them. These belts are preferably of polytetrafluoroethylene or silicone material.

While I have shown and described several embodiments in accordance with my invention, it is to be clearly understood that the same are susceptible to numerous changes apparent to one skilled in the art. Therefore, I do not wish to be limited to the details shown and described but intend to cover all such changes and modifications.

What is claimed is:

1. A griller for grilling a bun, said griller comprising;

a housing;

a stationary hot platen disposed within said housing; and a conveyor having a belt with a textured low friction surface capable of engaging said bun, said conveyor being disposed within said housing so as to convey said bun directly in contact with and along said platen to grill said bun.

2. The griller according to claim 1, wherein said belt is made of silicone material.

3. The griller according to claim 1, wherein said belt is made of polytetrafluoroethylene material.

4. The griller according to claim 1, wherein said conveyor includes pinch roller means for moving said belt.

5. The griller according to claim 4, wherein said conveyor further includes a spring tension support for maintaining said belt in pressurized engagement with said bun, whereby said bun is held in contact with said platen under variable tension.

6. The griller according to claim 1, wherein said belt is mounted on a metal conveyor.

7. A griller for grilling a bun, said griller comprising;

a housing;

a hot platen disposed within said housing; and a conveyor having a belt with a textured low friction surface capable of engaging said bun, said conveyor being disposed within said housing so as to convey said belt with said bun in contact with and along said platen to grill said bun, wherein said conveyor further includes a spring tension support for maintaining said belt in pressurized engagement with said bun, whereby said bun is held in contact with said platen under variable tension.

8. The griller of claim 7, further comprising a pinch roller means for moving said belt.

9. The griller of claim 8, wherein said belt is made of silicone material.

10. The griller of claim 9, wherein said belt is made of polytetrafluoroethylene material.

11. The griller of claim 10, wherein said textured surface is formed in a pattern that gives a moderate amount of friction to said surface.

12. The griller of claim 1, wherein said textured surface is formed in a pattern that gives a moderate amount of friction to said surface.

* * * * *